Patented July 27, 1943

2,325,051

UNITED STATES PATENT OFFICE 2,325,051

DENTAL IMPRESSION COMPOUND

Charles Victor Gross, Penfield, Pa., assignor to The S. S. White Dental Manufacturing Company, a corporation of Pennsylvania No Drawing. Application May 31, 1940, Serial No. 338,229

5 Claims. (Cl. 18—47)

This invention relates to the art of preparing impressions which reproduce accurately an article to be copied; and is concerned with a composition for such employment, and the method of using the same.

It is necessary to produce impressions of this nature in various industries, and highly accurate impressions are particularly required in the preparation of dentures, where comfort and appearance demand that the denture should accurately fit the mouth. For example, in preparing a denture, an impression is taken of the gums, and of any remaining teeth. This impression is withdrawn and filled with plaster of Paris, earth gypsum, or like material to form a matrix which accurately reproduces the mouth and permits the manufacture of the plate in strict conformity with the surface of the mouth, by molding or curing hard rubber, artificial resins, etc., in contact therewith.

Impressions of the oral cavity are commonly taken with plaster of Paris, with thermoplastic organic molding compositions with a resinous base commonly called modelling composition or impression compound, and with hydrocolloidal impression compounds. Each of these materials has disadvantages in practical use. For instance, plaster of Paris is unpleasant to the patient when placed in the mouth; and, furthermore, it sets to a hard brittle mass which will not withdraw from undercuts but must be broken away and removed in pieces. The thermoplastic resinous impression materials are more pleasant to use but they too are hard, rigid solids when ready for removal from the mouth and will not withdraw from undercuts without serious distortion. The hydrocolloidal compounds are prepared as viscous warm fluids which stiffen upon cooling to form gels which are sufficiently elastic to withdraw from undercuts without distortion and yield the most accurate impressions of the oral cavity now employed commercially, particularly when impressions are taken of jaws in which there are some standing teeth which may be tipped or otherwise out of alignment to such an extent that very serious undercuts exist. A disadvantage of these hydrocolloid compounds is that considerable time is consumed in their preparation for use; and, furthermore, they must be cooled before withdrawal from the mouth, by means of cold water sprays or by circulating cold water through the trays used in their application.

According to the present invention, an impression compound is provided that can be mixed at room temperature with water to form a paste, which can be placed in a tray and applied to the interior of the oral cavity while in its pasty and easily deformable condition, but which will set in a few minutes to a solid which is sufficiently elastic to withdraw from undercuts, etc., without permanent distortion.

The elastic base ingredient in this compound may be carob seed gum, an alginate, etc. Carob seed gum is obtained from seeds of the fruit of the carob tree (*Ceratonia siliqua*). This gum appears on the market under many names, such as locust bean gum, jandagum, gum gatto, etc. The gum is edible and has found some use in the manufacture of food products. This gum forms a mucilage in hot water, and on adding borax solution to the mucilage, the gum sets almost instantly to a strong tough elastic jelly. It has been found, however, that by using a sparingly soluble borate such as calcium borate instead of borax (sodium borate), the rate of gelling is reduced sufficiently so that the gum may be distended in water, and contacted with the surface to be reproduced, and the final stiff jelly is formed after the impression compound is in proper place.

It is preferred to add substantially inert fillers such as finely powdered silica, talc, ground marble, precipitated chalk or mixtures of such fillers; as it is difficult to mix the pure gum with water to form a smooth stiff paste, and the set jelly from such a paste does not have sufficient stiffness to make a satisfactory mold into which plaster of Paris, alpha gypsum, etc., can be cast to form a matrix from which the denture or other reproduction may be made.

The following formula makes an impression compound of desirable characteristics:

| | Parts by weight |
|---|---|
| Carob bean gum | 10 |
| Calcium borate | 0.25 |
| Precipitated chalk | 89.75 |

The carob bean gum is used in the form of a powder that will pass a 60 mesh sieve. The precipitated chalk is a powder that will pass a 200 mesh sieve. The three ingredients are thoroughly mixed together in the dry state. It is necessary to distribute the small quantity of calcium borate uniformly throughout the mass. Obviously, the compound may be colored and/or flavored, if desired. This mixture can be packaged, shipped, and stored over long periods of time when due precautions are taken to prevent hydration; and its form permits the dentist or other user to utilize only the quantity necessary for the work in hand.

The compound is prepared for impression taking by mixing with an equal weight of water, for instance, 30 grams of powder are spatulated with 30 cubic centimeters of water in a cup, rubber plaster bowl, or other suitable container. A soft plastic mass of about the consistency of wall plaster is produced. This mass is placed in a perforated impression tray or in a tray provided with an undercut rim or other retainer for the set mass, carried to the mouth, and firmly pressed home. Three or four minutes after the mass is placed in the mouth, it has gelled to a tough elastic solid which can be withdrawn from the mouth in one piece.

The mass after gelling does not adhere to the mouth, teeth, nor to the impression tray, which makes it preferable to use a perforated tray or one with an undercut rim or other suitable retaining means. A replica of the mouth is obtained by casting plaster of Paris of alpha gypsum into the impression.

The most critical component of the mixture is the setting agent, and the setting time of the composition is fixed by the particular compound and its proportion, as selected. The setting agent is a material for converting the mucilage into a continuous-phase gel. While many substances may be employed for the purpose, it is essential to select one which has a limited immediate solubility in the wetting agent, such as water, but which reacts with the base and effects, in proportion to its own rate of successive dissolution, a retarded setting or toughening of the original mucilaginous mass. For many employments, such as those of dental impressions, the material must be non-toxic: and it is also desirable that it may have a preservative or semi-sterilizing effect. It is therefore presently preferred to employ calcium borate or like slightly soluble borates.

The quantity of setting agent to be employed depends somewhat upon the consistency of the gel base and upon the content thereof in the mucilage or paste. With calcium borate of the above fineness, if more than 10 percent is used, by weight of the carob bean gum employed, the compound sets too rapidly for practical use, and a fluid or serum is excluded after setting. If less than $\frac{1}{5}$ percent is used, the jelly does not become hard enough for practical employment. A control can be effected by the size of the granules, as larger granules tend to dissolve more slowly: but the degree of control is restricted, as it is necessary to have an intimate mixture in order to assure a uniform product and a regular rate of uniform hardening.

The relative proportions of calcium carbonate, or other filters, and gum may be varied over wide limits, depending upon the characteristics desired in the impression material. If a highly elastic and flexible compound is desired, the gum might be increased to 30 percent with a corresponding reduction in the amount of filler. If a stiff and relative inelastic compound is desired, the gum would be reduced to about 4 percent and the filler correspondingly increased. Thus the presently preferred quantities of filler cover the range of substantially twice to twenty-five times the weight of the dry gum. The quantity of water is determined by the amount necessary for distending the gum to the desired mucilaginous consistency, and the amount which is absorbed by or required for saturating the filler. The calcium borate content is adjusted as required by the changing quantity of gum.

When sparingly soluble borates other than calcium borate are substituted, the quantities required depend upon the solubility of the particular borate it is desired to use.

The gist of the invention resides in the employment of a settable, mucilage-forming, gum-like material in association with a sparingly soluble gum-setting agent and an inert filler, these ingredients being preferably provided as an intimately mixed powdery mass which is capable of reacting with water to primarily form a paste having the distended gum therein, so that an accurate contacting with the surface to be reproduced is feasible, followed by the setting action of the agent as it goes into solution and becomes effective.

It is obvious that other materials than those set out can be employed for producing such a composition, and that the practice may be modified within the scope of the appended claims.

I claim:

1. A dry composition adapted upon mixing with water to form an impression paste capable of setting to an elastic solid, comprising carob seed gum in the form of a fine powder, a sparingly soluble borate in the form of a fine powder, and a powdered inert filler, said dry ingredients being intimately mixed together.

2. A dry composition adapted upon mixing with water to form an impression paste capable of setting to an elastic solid, comprising substantially ten parts of carob seed gum in the form of a fine powder, one-fourth part of powdered calcium borate, and substantially ninety parts of a powdered inert filler, said ingredients being intimately mixed together.

3. The process of forming an impression from a dry powdery mixture of carob seed gum, a sparingly soluble borate, and an inert filler; which comprises mixing the intimately blended ingredients of the composition with water to form a paste; coating the surface to be reproduced with the paste prior to the completed solution of the borate, permitting the material to remain in contact with the surface during the dissolution of the borate and the precipitating reaction thereof upon the carob seed gum whereby to form an elastic solid; and withdrawing the material as an elastic unit from the said surface.

4. A dry composition adapted upon mixing with water to form an impression paste capable of setting to an elastic solid, comprising a dry powdery organic compound of vegetable origin capable of quickly forming a mucilage with water, said compound being selected from the group consisting of carob seed gum and alginates, a sparingly soluble borate in the form of a fine powder, and a powdered inert filler, said dry ingredients being intimately mixed together.

5. A dry composition adapted upon mixing with water to form an impression paste capable of setting to an elastic solid, comprising a dry powdery organic compound of vegetable origin capable of quickly forming a mucilage with water, said compound being selected from the group consisting of carob seed gum and alginates, powdered calcium borate in the proportion of $\frac{1}{5}$ to 10 percent of the weight of the gum, and a powdered inert filler in a quantity of 2 to 25 times the weight of the gum, said dry ingredients being intimately mixed together.

CHARLES VICTOR GROSS.